April 9, 1935.  C. C. KEMP  1,997,491
ROTARY VALVE MECHANISM
Filed Feb. 8, 1933  4 Sheets-Sheet 1

Inventor
C. C. Kemp.
By Lacey & Lacey,
Attorneys

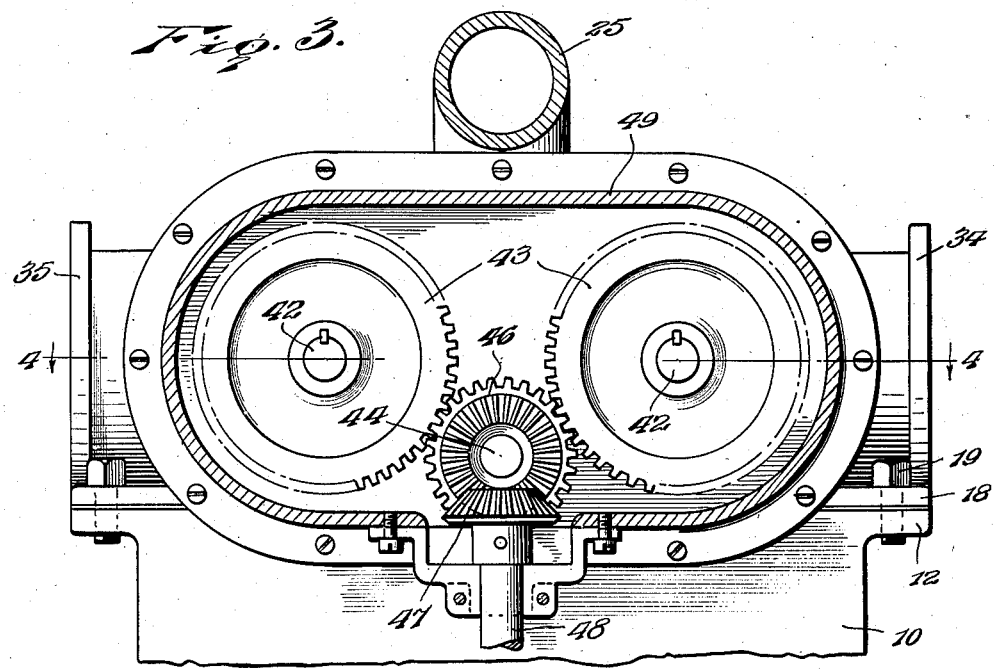
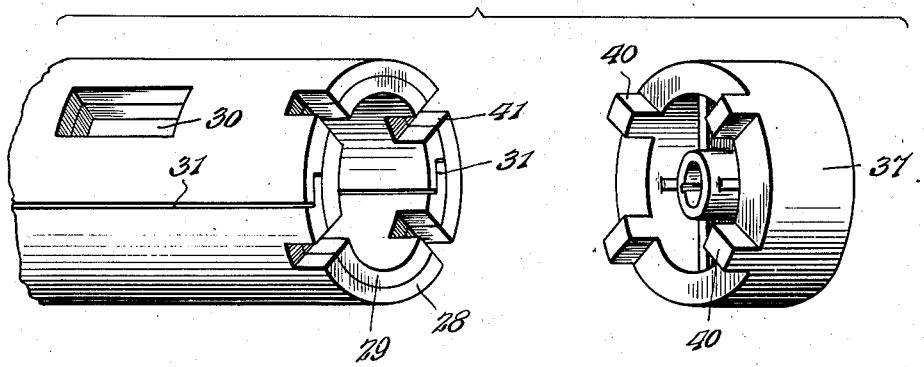

April 9, 1935.  C. C. KEMP  1,997,491
ROTARY VALVE MECHANISM
Filed Feb. 8, 1933  4 Sheets-Sheet 3

Inventor
C. C. Kemp,
By Lacey & Lacey,
Attorneys

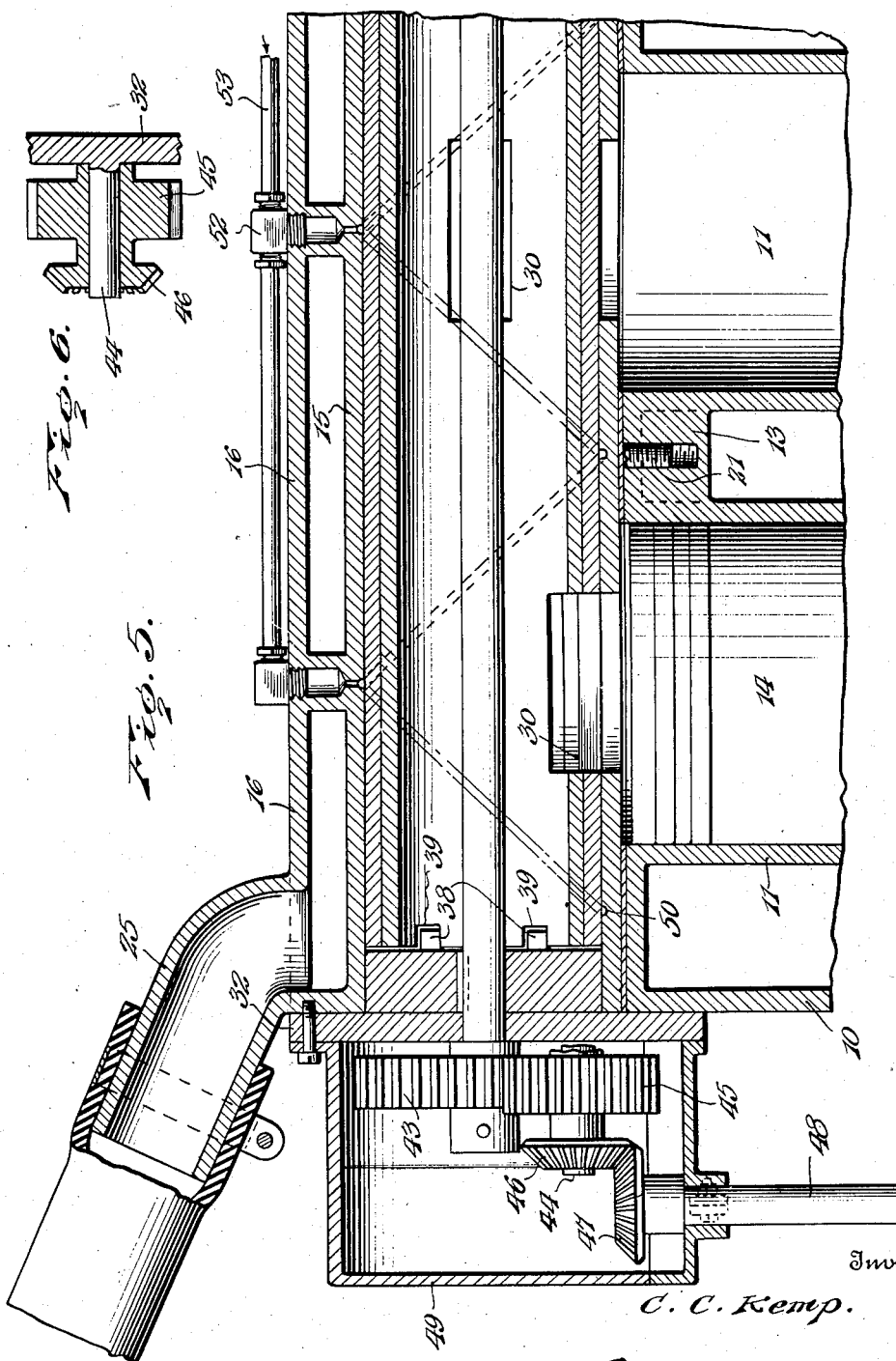

Patented Apr. 9, 1935

1,997,491

UNITED STATES PATENT OFFICE 1,997,491

ROTARY VALVE MECHANISM

Charles C. Kemp, Augusta, Ga.

Application February 8, 1933, Serial No. 655,854

1 Claim. (Cl. 123—190)

This invention relates to an improved rotary valve mechanism for internal combustion engines and seeks, among other objects, to provide a mechanism wherein compensation will automatically be made both for expansion and contraction of the valves as well as wear on the valves so that the valves will always function effectively while, at the same time, the multiplicity of parts found in conventional valve systems will be eliminated.

The invention seeks, as a further object, to provide a mechanism wherein the torque on the valves will be applied both at the front and rear thereof so that any tendency towards twisting of the valves will be overcome.

And the invention seeks, as a still further object, to provide a mechanism wherein the valves may be displaced without removing the engine head, if so desired.

Other and incidental objects of the invention, not specifically mentioned in the foregoing, will be apparent during the course of the following description.

Figure 1:
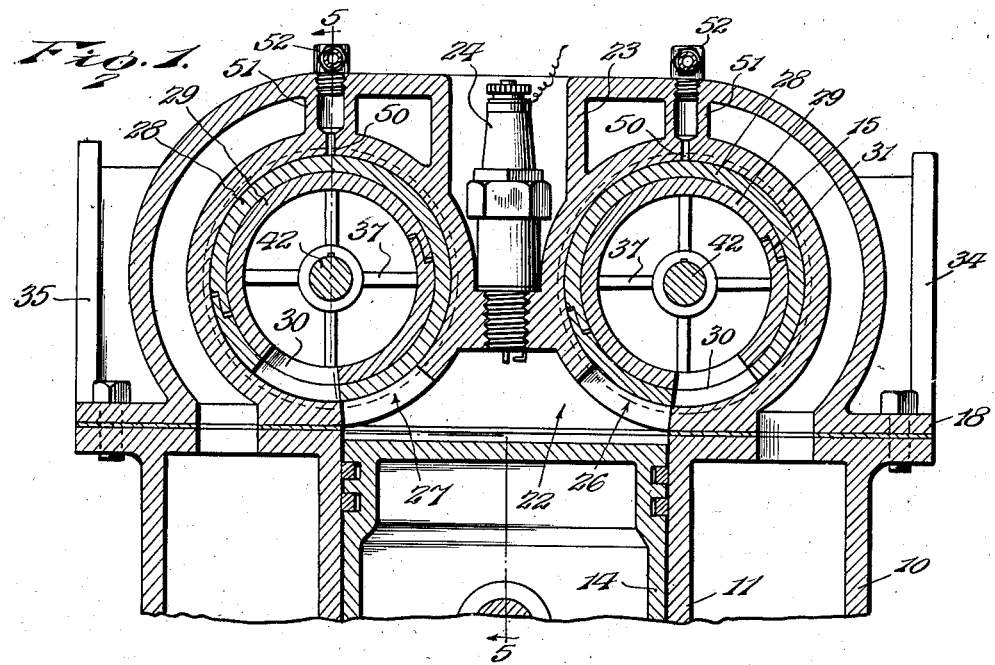
Figure 2:
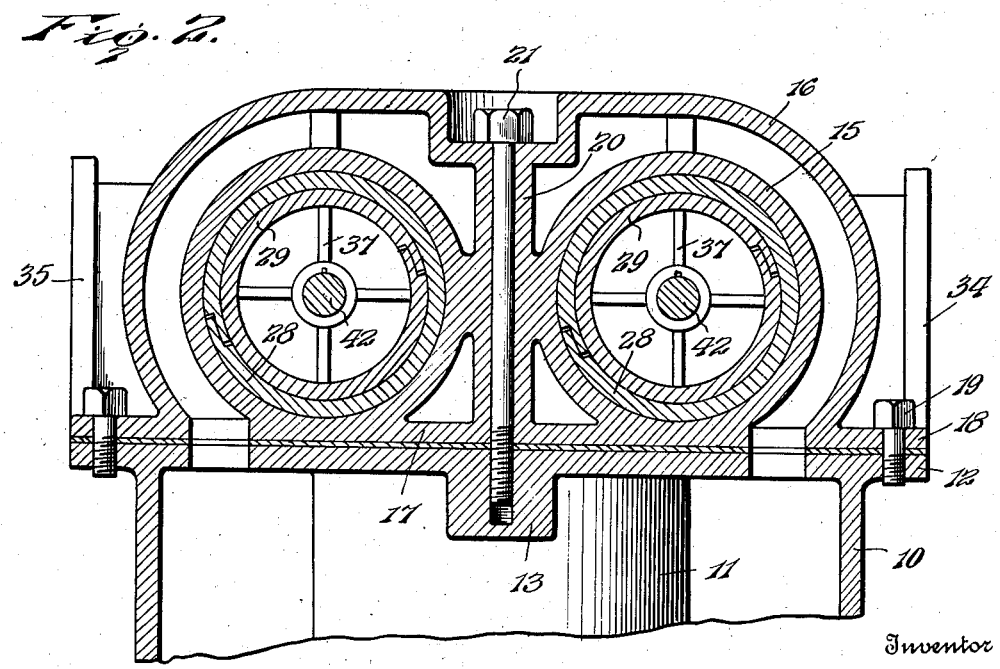
Figure 4:
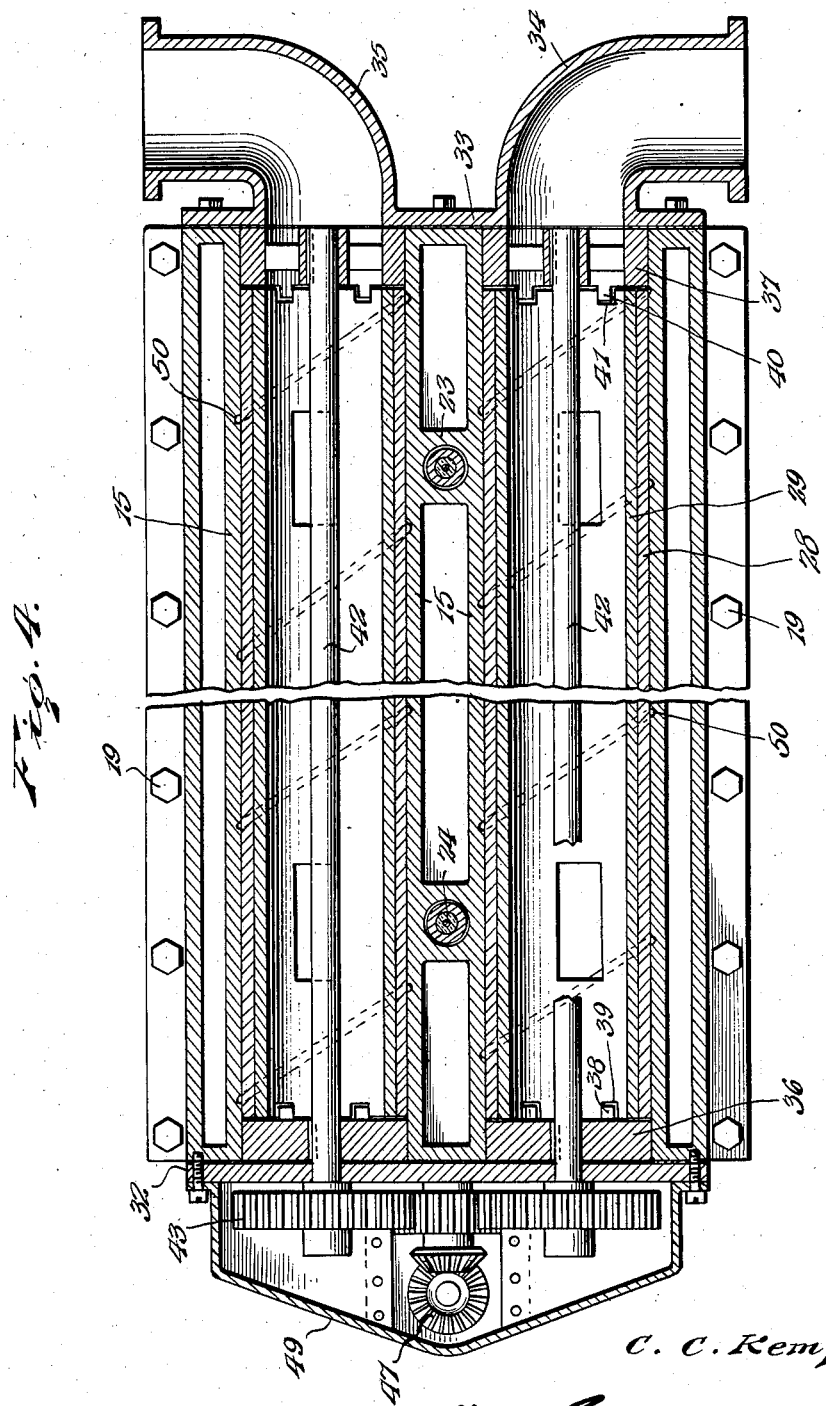

In the accompanying drawings, Figure 1 is a fragmentary transverse sectional view through an engine embodying my invention, this view being taken at one of the cylinders of the engine, Figure 2 is a fragmentary transverse sectional view taken through the engine between two of the cylinders thereof, Figure 3 is a fragmentary front elevation partly in section and showing the drive gears for the valves, Figure 4 is a horizontal sectional view on the line 4—4 of Figure 3, Figure 5 is a fragmentary vertical longitudinal sectional view on the line 5—5 of Figure 1, Figure 6 is a detail section showing one of the drive gears for the valves, and Figure 7 is a fragmentary perspective view showing an end of one of the valves and one of the driving spiders therefor.

Referring now more particularly to the drawings, I have shown an engine block at 10 which is provided at the upper ends of the cylinders 11 thereof with lateral longitudinal flanges 12, it being understood that the engine may embody any approved number of cylinders. The cylinders are suitably water jacketed and between the cylinders are webs 13. Reciprocal in the cylinders are pistons 14.

Mating with the block 10 is an engine head comprising identical cylindrical valve chambers 15 which are open at their ends and extend from front to rear of the head in parallel relation, these chambers being spaced equi-distantly at opposite sides of the vertical axes of the cylinders. Surrounding the chambers 15 is a water jacket 16 connected between the chambers by suitable webs arranged at spaced points along the chambers and merging, as particularly seen in Figure 2, into a flat bottom plate 17 mating with the engine block. At the sides of the head are lateral longitudinal flanges 18 overlying the flanges 12 and extending through said flanges are spaced cap bolts 19 securing the head to the block, an approved gasket being interposed between the head and block. Appropriate ports are provided to establish communication between the water jacket of the head and the water jacket of the block and, at points alining with the webs 13, the head is provided with sleeves 20 through which extend cap bolts 21 screwed into said webs for connecting the head with the block at points between the engine cylinders. At each of the cylinders the head is, as particularly seen in Figure 1, formed to provide an upwardly tapered firing chamber 22 the convex side walls of which are formed by the valve chambers 15 and axially of the firing chambers, as well as axially of the cylinders, the head is provided with cups 23 in which are disposed spark plugs 24 communicating with the respective firing chambers. Leading from the jacket 16 at its forward end, as particularly seen in Figure 5, is an outlet 25 to which may be attached a hose communicating with a suitable radiator.

Formed in the confronting walls of the chambers 15 at each of the firing chambers 22 is an intake port 26 and an exhaust port 27 and rotatably fitting in said chambers are intake and exhaust valves which are identical in construction and each of which comprises an outer sleeve 28 and an inner sleeve 29. Each of these sleeves is initially formed as a cylinder, the outer sleeve being ground to a smooth surface on both sides and the inner sleeve being ground to a smooth surface on its outer side. The sleeves are then formed at the proper locations with slots which register to provide a port 30 for each of the firing chambers 22, and subsequently the sleeves are cut from end to end to provide stepped joints 31.

The sleeves of the valves are resilient and the outer sleeves are initially of such diameter that said sleeves must be compressed to fit within the valve chambers 15. Likewise, the inner sleeves must be compressed to fit within the outer sleeves. Accordingly, the outer sleeves will expand against the valve chambers to at all times have close contact therewith while, at the same time, said sleeves will be adapted to conform to unforeseen irregularities in said chambers. Similarly, the inner sleeves will expand within the outer sleeves to at all times have close contact therewith and in this connection, attention is directed to the fact that sufficient clearance will be provided at the joints 31 of the sleeves to accommodate circumferential expansion and contraction of the sleeves. Furthermore, it will be noted that the joints of the inner sleeves are disposed opposite the joints of the outer sleeves so that when the joints of the outer sleeves cross the intake and exhaust ports 26 and 27, leakage of gases between the inner and outer sleeves will be prevented.

Removably bolted to the front end of the engine head is a front plate 32 and removably bolted to the rear end of the head is a manifold 33 having a laterally directed fuel intake 34 and an oppositely directed lateral exhaust 35.

Confined by the plate 32 and manifold 33 are driving spiders 36 at the forward ends of the valves and driving spiders 37 at the rear ends of the valves. The spiders 36 are solid and are provided at their inner sides with a plurality of circumferentially spaced lugs 38. Formed in the forward edges of the valve sleeves are registering notches 39 which freely receive said lugs, clearance being provided to accommodate circumferential expansion as well as lineal expansion of the valve sleeves, although the play is not sufficient to permit the ports in the sleeves to get out of substantial alinement. The spiders 37 are of skeleton construction, as shown, and projecting from the inner sides of these spiders are circumferentially spaced lugs 40. Formed in the rear edges of the valve sleeves are registering notches 41 which freely receive said lugs, clearance being provided as in the instance of the notches 39, to accommodate circumferential expansion as well as lineal expansion of the valve sleeves.

The spiders 36 and 37 rotatably fit in the ends of the valve chambers 15, the spiders 36 forming closures at the forward ends of the valves and the spiders 37, being of skeleton construction, providing for the flow of gases therethrough into the intake valve and out of the exhaust valve. Journaled through the front plate 32 and extending axially through the spiders 36 and 37 are drive shafts 42 to which the spiders are keyed. Any approved mechanism may be employed for driving these shafts and accordingly rotating the valves at half crank shaft speed. In the present instance, I have shown the use of pinions 43 fixed to the forward ends of the shafts, and projecting from the front plate 32, as shown in detail in Figure 6, is a stub shaft 44 on which is journaled a pinion 45 meshing with the former pinions. Integral with the pinion 45 or otherwise connected thereto is a beveled gear 46 and meshing with the beveled gear is a beveled gear 47 at the upper end of a drive shaft 48 which, in turn, is suitably connected wtih the crank shaft of the engine. Enclosing the several gears is a housing 49 secured to the front plate 32 by the same bolts which attach said plate to the engine head.

Formed in the inner surfaces of the walls of the valve chambers 15 are spiral oil grooves 50 and formed on the head at the upper side of the jacket 16, as particularly seen in Figure 1, are oil cups 51 arranged at spaced points along the jacket to communicate with said grooves. Screwed into these cups are fittings 52 and connecting the fittings are oil distributing pipes 53 leading from a suitable oil pump. Thus, the outer sleeves of the valves will be constantly lubricated to prevent sticking as well as minimize wear.

Attention is now directed to the fact that by displacing the bolts 19, the engine head with the assembled valves thereon may, if so desired, be bodily removed as a unit. On the other hand, the entire valve assembly consisting of driving gears 43, plate 32, spiders 38, spiders 37, shafts 42 and valve sleeves 28 and 29 may be withdrawn without removing the head from the block, thus making the entire valve assembly readily accessible and removable. Furthermore, it is to be noted that the fuel gases entering at the intake 34 may follow a straight course through the intake valve to the several ports thereof and similarly, the exhaust gases entering the exhaust valve may flow freely therethrough to the exhaust 35. As best brought out in Figures 1 and 2, the valve chambers 15 are completely water jacketed except at the firing chambers 22 so that substantially uniform expansion and contraction of the valve chambers will be had and overheating prevented while, also, the fuel gases entering the intake valve will be subjected to a practically constant warming temperature therein.

Having thus described the invention, I claim:

In an internal combustion engine, a cylindrical valve chamber having a port in one side, a cylindrical valve fitting snugly but rotatably mounted in the valve chamber and having its ends spaced from ends of the chamber, said valve consisting of closely fitting concentric sleeves provided with registering ports disposed for moving into and out of registry with the port of the chamber during rotation of the valve, each sleeve having a joint extending from end to end thereof and disposed out of alinement with the ports, the walls of each joint overlapping and the joint of one sleeve being spaced circumferentially from the joint of the other sleeve, the ends of the sleeves having radial notches formed therein, spiders fitted in the valve chamber between ends of the sleeves and ends of the chamber, said spiders having lugs projecting inwardly therefrom and engaged in the notches of the sleeves and having clearance in the notches to accommodate longitudinal and circumferential expansion of the sleeves and maintain the ports of the sleeves in alinement, one spider being formed with openings permitting flow of fuel through the cylindrical valve and the other spider being solid and forming a head for the adjacent end of the valve, a shaft extending axially through the inner sleeve and secured to the spiders whereby the spiders and sleeves turn with the shaft, and means for rotating the shaft.

CHARLES C. KEMP.